US010738834B2

(12) United States Patent
Oosawa et al.

(10) Patent No.: US 10,738,834 B2
(45) Date of Patent: Aug. 11, 2020

(54) JOINT FOR TORQUE TRANSMISSION AND WORM REDUCTION GEAR

(71) Applicant: NSK LTD., Tokyo (JP)

(72) Inventors: Ryou Oosawa, Maebashi (JP); Nobuyuki Nishimura, Maebashi (JP)

(73) Assignee: NSK LTD., Tokyo (JP)

( * ) Notice: Subject to any disclaimer, the term of this patent is extended or adjusted under 35 U.S.C. 154(b) by 305 days.

(21) Appl. No.: 15/561,237

(22) PCT Filed: Apr. 27, 2016

(86) PCT No.: PCT/JP2016/063302
§ 371 (c)(1),
(2) Date: Sep. 25, 2017

(87) PCT Pub. No.: WO2016/175267
PCT Pub. Date: Nov. 3, 2016

(65) Prior Publication Data
US 2018/0066713 A1 Mar. 8, 2018

(30) Foreign Application Priority Data
Feb. 29, 2016 (JP) .................................. 2016-036511

(51) Int. Cl.
*F16D 3/58* (2006.01)
*F16H 55/24* (2006.01)
(Continued)

(52) U.S. Cl.
CPC .............. *F16D 3/58* (2013.01); *B62D 5/0409* (2013.01); *F16D 3/54* (2013.01); *F16D 3/74* (2013.01);
(Continued)

(58) Field of Classification Search
CPC ...... F16D 3/58; F16D 3/54; F16D 3/74; F16H 55/24; B62D 5/0409; H02K 7/003; H02K 7/1166
(Continued)

(56) References Cited

U.S. PATENT DOCUMENTS 1,983,007 A 12/1934 Simons
2,114,807 A 4/1938 McCavitt
(Continued)

FOREIGN PATENT DOCUMENTS

CN 101128682 A 2/2008
CN 107407337 A 11/2017
(Continued)

OTHER PUBLICATIONS

Communication dated Jul. 3, 2018, from the Japanese Patent Office in counterpart application No. 2017-515597.
(Continued)

*Primary Examiner* — Greg Binda
(74) *Attorney, Agent, or Firm* — Sughrue Mion, PLLC

(57) ABSTRACT

Circumferential rigidity of both axial end portions of each coupling-side convex portion is lower than circumferential rigidity of an axially intermediate portion of each coupling-side convex portion. The drive-side concave-convex portion is engaged with a half portion on the other axial side of the coupling-side concave-convex portion. The driven-side concave-convex portion is engaged with a half portion on one axial side of the coupling-side concave-convex portion.

7 Claims, 21 Drawing Sheets

(51) Int. Cl.
*F16D 3/54* (2006.01)
*H02K 7/00* (2006.01)
*B62D 5/04* (2006.01)
*H02K 7/116* (2006.01)
*F16D 3/74* (2006.01)

(52) U.S. Cl.
CPC ............ *F16H 55/24* (2013.01); *H02K 7/003* (2013.01); *H02K 7/1166* (2013.01)

(58) Field of Classification Search
USPC ....................................................... 464/49, 88
See application file for complete search history.

(56) References Cited

U.S. PATENT DOCUMENTS

| | | | | |
|---|---|---|---|---|
| 2,592,309 | A | * | 4/1952 | Meier ..................... F16D 3/185 464/88 |
| 2,699,656 | A | * | 1/1955 | Anderson ................. F16D 3/06 464/88 |
| 6,159,102 | A | | 12/2000 | Hennessey et al. |
| 10,288,126 | B2 | * | 5/2019 | Segawa .................... B62D 5/04 |
| 2002/0195893 | A1 | | 12/2002 | Kobayashi et al. |
| 2008/0035414 | A1 | | 2/2008 | Kubota et al. |
| 2012/0004043 | A1 | | 1/2012 | Lehmann |
| 2018/0080502 | A1 | | 3/2018 | Oosawa |

FOREIGN PATENT DOCUMENTS

| | | | | |
|---|---|---|---|---|
| DE | 27 51 151 | A1 | 5/1979 | |
| EP | 1 270 368 | A2 | 1/2003 | |
| EP | 3 267 062 | A1 | 1/2018 | |
| GB | 1145460 | * | 3/1969 | ...................... 464/88 |
| JP | 44-029324 | B1 | 11/1969 | |
| JP | 57-139730 | | 9/1982 | |
| JP | 9-4647 | A | 1/1997 | |
| JP | 11-325099 | A | 11/1999 | |
| JP | 2002-145083 | A | 5/2002 | |
| JP | 2004-286181 | A | 10/2004 | |
| JP | 2004-306898 | A | 11/2004 | |
| JP | 2005-297824 | A | 10/2005 | |
| JP | 2012-131249 | A | 7/2012 | |
| JP | 2014-35040 | A | 2/2014 | |

OTHER PUBLICATIONS

Communication dated Mar. 29, 2019, issued by the Chinese Patent Office in counterpart Chinese Application No. 201680018261.3.
Communication issued by the European Patent Office dated Mar. 12, 2018 in counterpart European Patent Application No. 16786543.5.
International Search Report dated Aug. 2, 2016 issued by the International Searching Authority in counterpart International Application PCT/JP2016/063302 (PCT/ISA/210).
Written Opinion dated Aug. 2, 2016 issued by the International Searching Authority in counterpart International Application PCT/JP2016/063302 (PCT/ISA/237).

* cited by examiner

JOINT FOR TORQUE TRANSMISSION AND WORM REDUCTION GEAR

TECHNICAL FIELD

A torque-transmission joint of the present invention is to be incorporated into a variety of mechanical apparatuses and is to be used for transmitting torque between a drive shaft and a driven shaft. Also, a worm reduction gear of the present invention is to be incorporated into an electric power steering device, for example.

RELATED ART

When applying a steering angle to steered wheels (generally, front wheels except for a special vehicle such as a forklift), a power steering device has been widely used as a device for reducing a force necessary for a driver to operate a steering wheel. Also, regarding the power steering device, an electric power steering device configured to use an electric motor as an auxiliary power source has also been recently spread. In the electric power steering device, auxiliary power of the electric motor is applied to a steering shaft, which is configured to rotate in accordance with an operation of the steering wheel, or a member that is configured to be displaced as the steering shaft rotates, via a reduction gear. A direction of the auxiliary power that is to be applied from the electric motor is the same as that of a force that is to be applied from the steering wheel. As the reduction gear, a worm reduction gear is generally used. According to the electric power steering device using the worm reduction gear, a worm configured to rotate by the electric motor and a worm wheel are meshed with each other. The worm wheel is configured to rotate together with a rotary shaft, which is a member engaged so that the power can be transmitted to the steering shaft or the member configured to be displaced as the steering shaft rotates. In this way, the auxiliary power of the electric motor is freely transmitted to the rotary shaft. In the worm reduction gear, when changing a rotating direction of the rotary shaft, an uncomfortable abnormal noise referred to as gear-tooth striking sound may be generated due to a backlash existing at the meshed part between the worm and the worm wheel, if any measures are not taken.

In order to suppress the gear-tooth striking sound, it has been considered to elastically press the worm towards the worm wheel by an elastic member such as a spring. FIGS. 20 and 21 depict an example of the electric power steering device disclosed in Patent Document 1. A front end portion of a steering shaft 2 configured to rotate in a predetermined direction by a steering wheel 1 is rotatably supported in a housing 3 and a worm wheel 4 is fixed to the corresponding part. Also, worm teeth 6 are provided on an axially intermediate part of a worm 8. At a state where the worm teeth 6 and a tooth part 5 formed on an outer peripheral surface of the worm wheel 4 are meshed, the worm 8 is rotatably supported at two axial positions (both axial positions of the worm teeth 6), at which the worm teeth 6 are interposed therebetween, in the housing 3 by a pair of rolling bearings 9a, 9b such as deep groove ball bearings or the like. The worm 8 is configured to be rotatable by an output shaft of an electric motor 7 connected to a base end portion thereof. Also, a pressing piece 10 is externally fitted to a tip end portion of the worm 8, which protrudes beyond the rolling bearing 9a. An elastic member such as a coil spring 11 is provided between the pressing piece 10 and the housing 3. By the coil spring 11, the worm teeth 6 of the worm 8 are pressed towards the tooth part 5 of the worm wheel 4 via the pressing piece 10. By this configuration, the backlash between the worm teeth 6 and the tooth part 5 is suppressed, so that the gear-tooth striking sound is suppressed.

According to the above structure of the related art, it is possible to suppress the gear-tooth striking sound from being generated at the meshed part between the worm teeth 6 and the tooth part 5. However, it is not possible to suppress an abnormal noise, which is to be generated at a coupled part between a tip end portion of the output shaft 12 of the electric motor 7 and the base end portion of the worm 8. This situation is described as follows. In the shown structure, in order to couple the tip end portion of the output shaft 12 of the electric motor 7 and the base end portion of the worm 8 so that the torque can be transmitted, the base end portion of the worm 8 is formed with a spline hole 13. The spline hole 13 opens towards a base end surface of the worm 8. In the meantime, the tip portion of the output shaft 12 is formed with a spline shaft part 14. The spline shaft part 14 and the spline hole 13 are spline-engaged, so that the output shaft 12 and the worm 8 are coupled so that the torque can be transmitted.

When the spline shaft part 14 and the spline hole 13 are spline-engaged without a circumferential gap (without the backlash), the abnormal noise does not occur at the coupled part (the spline engagement part) between the tip portion of the output shaft 12 and the base end portion of the worm 8. However, as shown in FIG. 21, according to the structure where the worm teeth 6 of the worm 8 is elastically pressed towards the tooth part 5 of the worm wheel 4 by the coil spring 11 so as to suppress the backlash between the worm teeth 6 and the tooth part 5, since it is necessary to cause the worm 8 to oscillate and be displaced, it is not possible to completely remove the backlash of the spline engagement part, so that it is difficult to prevent the abnormal noise.

Patent Document 2 discloses a structure where the output shaft of the electric motor and the worm shaft are coupled via a metallic cylindrical power transmission member for smooth oscillation and displacement of the worm shaft. Also in the structure of Patent Document 2, since the worm shaft is caused to oscillate and be displaced, the backlashes exist at the spline engagement parts between the spline shaft parts (male splines) provided at both end portions of the power transmission member and the spline holes (female splines) provided at respective end portions of the worm shaft and the output shaft of the electric motor, respectively. For this reason, the abnormal noise may be generated when changing a rotating direction of the rotary shaft.

CITATION LIST

Patent Documents

Patent Document 1: Japanese Patent Application Publication No. 2004-306898A
Patent Document 2: Japanese Patent Application Publication No. 2012-131249A

SUMMARY OF THE INVENTION

Problems to be Solved

The present invention has been made in view of the above situations, and an object of the present invention is to implement a torque-transmission joint capable of smoothly transmitting torque between a drive shaft and a driven shaft even when central axes of the drive shaft and the driven shaft are mismatched each other and preventing an abnormal noise from being generated between the drive shaft and the driven shaft.

Means for Solving the Problems

Regarding a torque-transmission joint and a worm reduction gear of the present invention, the torque-transmission joint is configured to transmit torque between one axial end portion of a drive shaft and the other axial end portion of a driven shaft arranged in series with each other in an axial direction, and includes a coupling, a drive-side transmission part and a driven-side transmission part.

The coupling is provided on one circumferential surface of inner and outer circumferential surfaces with a coupling-side concave-convex portion having coupling-side convex portions arranged at a plurality of circumferential places and protruding in a radial direction (a radially inner side when the one circumferential surface is the inner peripheral surface; a radially outer side when the one circumferential surface is the outer peripheral surface).

The drive-side transmission part is provided at one axial end portion of the drive shaft and is provided on one circumferential surface, which faces the coupling-side concave-convex portion, of inner and outer circumferential surfaces with a drive-side concave-convex portion having drive-side convex portions arranged at a plurality of circumferential places and protruding in a radial direction (a radially outer side when the circumferential surface facing the coupling-side concave-convex portion is the outer peripheral surface; a radially inner side when the circumferential surface facing the coupling-side concave-convex portion is the inner peripheral surface).

The driven-side transmission part is provided at the other axial end portion of the driven shaft and is provided on one circumferential surface, which faces the coupling-side concave-convex portion, of inner and outer circumferential surfaces with a driven-side concave-convex portion having driven-side convex portions arranged at a plurality of circumferential places and protruding in a radial direction (a radially outer side when the circumferential surface facing the coupling-side concave-convex portion is the outer peripheral surface; a radially inner side when the circumferential surface facing the coupling-side concave-convex portion is the inner peripheral surface).

Also, circumferential rigidity of both axial end portions of each coupling-side convex portion is made lower than circumferential rigidity of an axially intermediate portion of each coupling-side convex portion.

The drive-side concave-convex portion is engaged with a half portion on the other axial side of the coupling-side concave-convex portion, and the driven-side concave-convex portion is engaged with a half portion on one axial side of the coupling-side concave-convex portion.

In the meantime, when implementing the torque-transmission joint of the present invention, at a state where central axes of the drive shaft and the driven shaft are matched, at least an axial portion of a circumferential side surface of each of the drive-side and driven-side convex portions is preferably made to contact or to closely face a circumferential side surface of each coupling-side convex portion without rattling in the circumferential direction (at least axial portions of both the drive-side and driven-side concave-convex portions are engaged with the coupling-side concave-convex portion without rattling in the circumferential direction).

When implementing the torque-transmission joint of the present invention, both axial end surfaces of each coupling-side convex portion are formed with concave portions axially recessed.

When implementing the torque-transmission joint of the present invention, at the state where the central axes of the drive shaft and the driven shaft are matched, the drive-side concave-convex portion is preferably engaged with the half portion on the other axial side of the coupling-side concave-convex portion with a drive-side gap of which a circumferential width size increases towards the other axial side being interposed between the circumferential side surface of each drive-side convex portion and the circumferential side surface of each coupling-side convex portion. Also, at the state where the central axes of the drive shaft and the driven shaft are matched, the driven-side concave-convex portion is engaged with the half portion on one axial side of the coupling-side concave-convex portion with a driven-side gap of which a circumferential width size increases towards one axial side being interposed between the circumferential side surface of each driven-side convex portion and the circumferential side surface of each coupling-side convex portion.

When implementing the present invention, the circumferential side surface of each coupling-side convex portion is preferably formed to have a crowning shape inclined in a direction in which a circumferential width size of each coupling-side convex portion is greatest at an axially intermediate portion and decreases towards both axial end portions (inclined in a direction in which a circumferential protruding amount decreases towards an axial end portion).

For example, both circumferential side surfaces of each of the drive-side and driven-side convex portions may be configured as flat surfaces parallel with each other and may be formed to have a crowning shape inclined in a direction in which the circumferential width size of each of the drive-side and driven-side convex portions is greatest (thickest) at the axially intermediate portion and decreases (becomes thinner) towards both axial end portions.

Also, when implementing the present invention, at the state where the central axes of the drive shaft and the driven shaft are matched, one axial end portion of the circumferential side surface of each drive-side convex portion and the circumferential side surface of the coupling-side convex portion are preferably made to contact or to closely face each other without rattling in the circumferential direction. Also, at the state where the central axes of the drive shaft and the driven shaft are matched, the other axial end portion of the circumferential side surface of each driven-side convex portion and the circumferential side surface of the coupling-side convex portion are preferably made to contact or to closely face each other without rattling in the circumferential direction.

Also, when implementing the present invention, preferably, one circumferential surface of both the inner and outer circumferential surfaces of the coupling is formed with a coupling-side protrusion protruding in the radial direction, and the coupling-side protrusion is positioned between the drive-side transmission part and the driven-side transmission part in the axial direction.

Also, when implementing the present invention, preferably, a thickness-reduced portion opening into both axial end surfaces of each coupling-side convex portion and an outer peripheral surface of the coupling is provided.

Also, when implementing the present invention, preferably, the thickness-reduced portion has a triangular portion of which a width size decreases axially inwards from both axial end surfaces of each coupling-side convex portion and a rectangular portion connected to a tip end portion of the triangular portion and further extending axially inwards.

Also, the worm reduction gear includes a housing, a worm wheel, a worm and an electric motor.

The worm wheel is rotatably supported to the housing.

The worm is rotatably supported to the housing at a state where worm teeth provided on an axially intermediate portion thereof are meshed with the worm wheel.

The electric motor is provided to rotatively drive the worm.

The worm and an output shaft of the electric motor are connected by a torque-transmission joint so that torque can be transmitted.

Particularly, in the worm reduction gear of the present invention, the torque-transmission joint is configured by the above-described torque-transmission joint of the present invention. In this case, the output shaft of the electric motor corresponds to the drive shaft, and the worm shaft corresponds to the driven shaft.

When implementing the worm reduction gear of the present invention, a preload applying mechanism configured to elastically press the worm towards the worm wheel is preferably provided between a tip portion of the worm (an end portion opposite to a side coupled to the output shaft of the electric motor via the torque-transmission joint) and the housing.

Effects of the Invention

According to the torque-transmission joint and the worm reduction gear of the present invention, even when the central axes of the drive shaft and the driven shaft are mismatched, it is possible to smoothly transmit the torque between the drive shaft and the driven shaft, so that it is possible to easily prevent an abnormal noise from being generated between the drive shaft and the driven shaft.

That is, according to the present invention, the circumferential rigidity of both axial end portions of each coupling-side convex portion is made lower than the circumferential rigidity of the axially intermediate portion of each coupling-side convex portion. Therefore, when the central axes of the drive shaft and the driven shaft are mismatched, both axial end portions of each of the coupling-side convex portion is (circumferentially) elastically deformed, so that the coupling is inclined relative to at least one shaft of the drive shaft and the driven shaft. Thereby, it is possible to smoothly transmit the torque between the drive shaft and the driven shaft.

Also, according to the present invention, the circumferential rigidity of both axial end portions of each coupling-side convex portion is made lower and both axial end portions are configured to be elastically deformed, so that the coupling can be caused to oscillate. For this reason, it is possible to bring at least a part of the circumferential side surface of each of the drive-side and driven-side convex portions into contact with or to closely face the circumferential side surface of each coupling-side convex portion without the rattling in the circumferential direction. According to this configuration, it is possible to prevent the circumferential side surface of each of the drive-side and driven-side convex portions and the circumferential side surface of each coupling-side convex portion from strongly colliding (hard colliding) with each other, so that it is possible to prevent the abnormal noise from being generated at a collision part between the respective circumferential side surfaces.

DETAILED DESCRIPTION OF EMBODIMENTS

First Example of Embodiment

Figure 20:
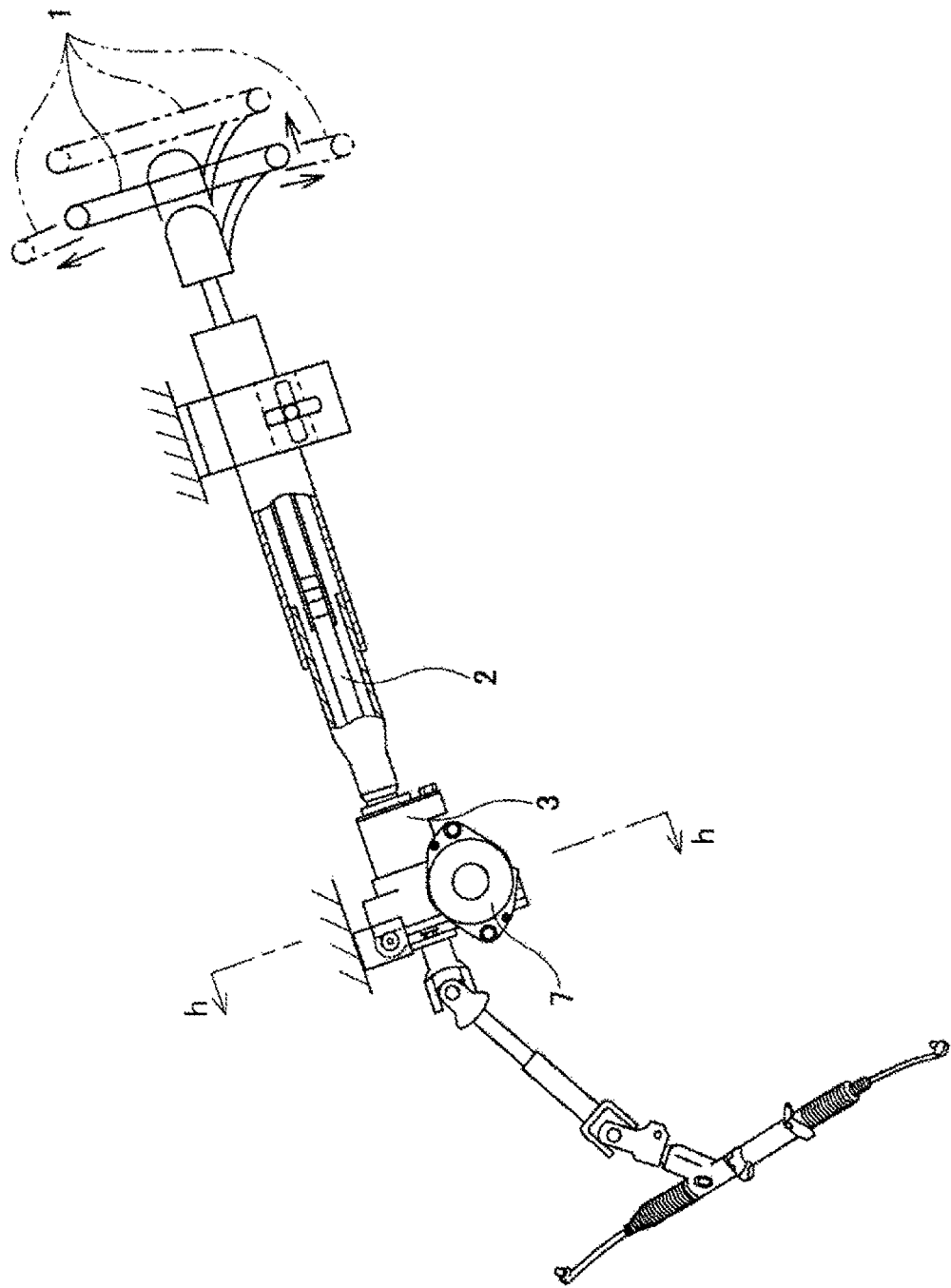
FIG. 20 is a partially longitudinal side view depicting an example of a steering device for an automobile.
Figure 21:
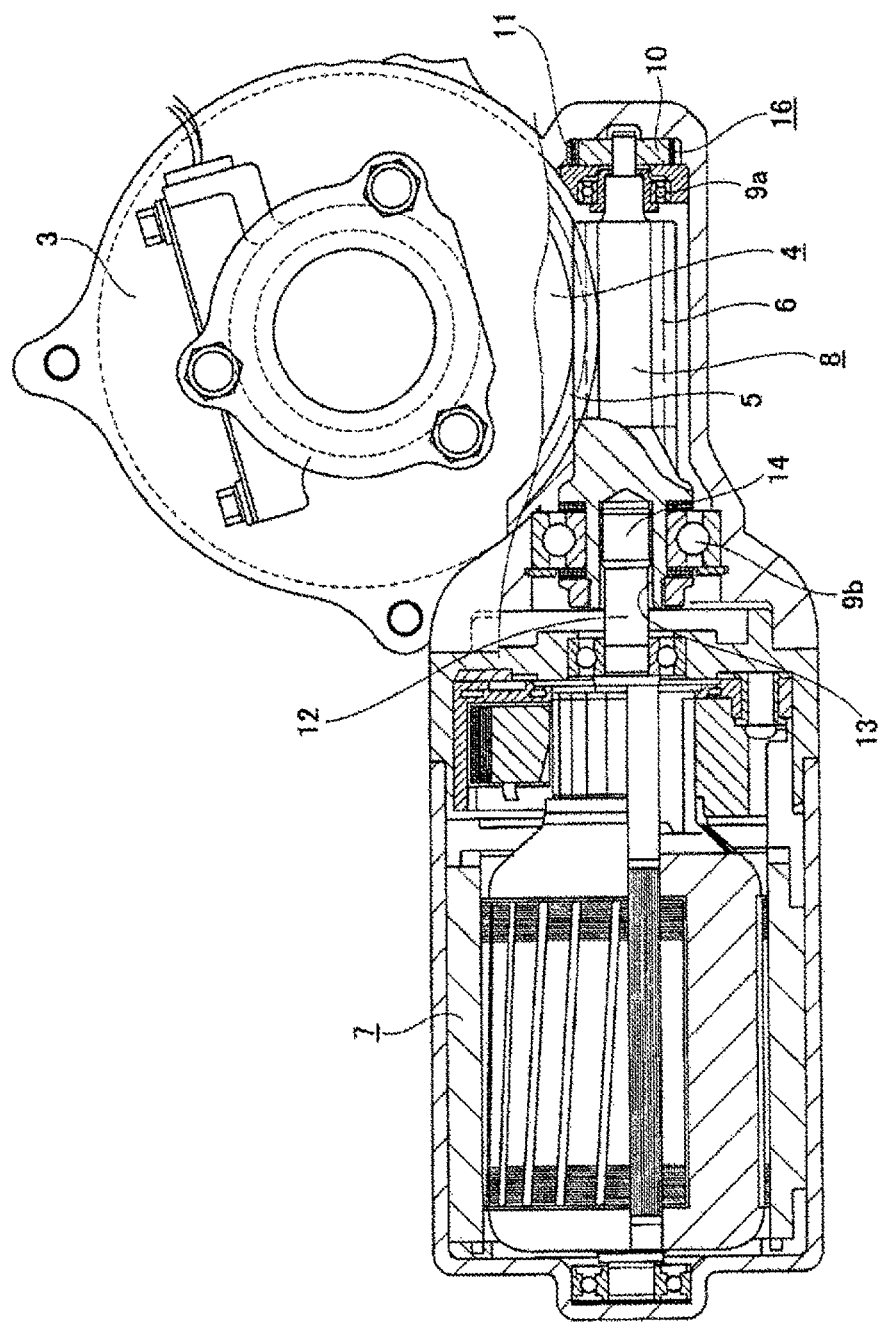
FIG. 21 is an enlarged sectional view taken along a line h-h of FIG. 20, depicting an example of a conventional structure of an electric power steering device.

FIGS. 1 to 5B depict a first example of an embodiment of the present invention. In the first example, a worm reduction gear 15 includes a housing 3, a worm wheel 4, a worm 8a and an electric motor 7 (refer to FIGS. 20 and 21).

The worm wheel 4 is supported to be freely rotatable inside the housing 3. An outer peripheral surface of the worm wheel 4 is formed with a tooth part 5.

At a state where worm teeth 6 provided on an axially intermediate portion of the worm 8a and the tooth part 5 of the worm wheel 4 are meshed, the worm 8a is supported to be freely rotatable at two axial positions (both axial positions of the worm teeth 6), at which the worm teeth 6 are interposed therebetween, in the housing 3 by a pair of rolling bearings 9a, 9b (refer to FIG. 21) such as deep groove ball bearings or the like. In the meantime, a preload applying mechanism 16 (refer to FIG. 21) having a pressing piece 10 and a coil spring 11 is provided between a tip end portion of the worm 8a and the housing 3. The preload applying mechanism 16 is configured to press the worm teeth 6 provided on the worm 8a towards the tooth part 5 of the worm wheel 4. By this configuration, a backlash between the worm teeth 6 and the tooth part 5 is suppressed, so that a gear-tooth striking sound is suppressed.

The electric motor 7 is supported and fixed to the housing 3. A tip end portion (one axial end portion; a left end portion in FIG. 1) of an output shaft 12a, which is the drive shaft of the electric motor 7, is connected to a base end portion (the other axial end portion; a right end portion in FIG. 1) of the worm 8a. Thereby, the worm 8a can be rotatively driven by the electric motor 7.

The tip end portion of the output shaft 12a of the electric motor 7 and the base end portion of the worm 8a are coupled via a torque-transmission joint 17 so that torque can be transmitted. The torque-transmission joint 17 has a drive-side transmission part 18, a driven-side transmission part 19 and a coupling 20.

The drive-side transmission part 18 has a drive-side transmission member 22 that is provided separately from an output shaft main body 21 of the output shaft 12a and is supported and fixed to a tip end portion of the output shaft main body 21. The drive-side transmission member 22 is made of a synthetic resin such as polyamide resin or sintered metal, for example. The drive-side transmission member 22 has a drive-side cylindrical part 24, a drive-side concave-convex portion 26 and a drive-side collar part 39. The drive-side cylindrical part 24 is formed at its central portion with a drive-side engaging hole 23. The drive-side concave-convex portion 26 has drive-side convex portions 25, 25 and a drive-side concave portion 43. The drive-side convex portions 25, 25 protrude radially outwards (radial direction) from one axial end portion of an outer peripheral surface of the drive-side cylindrical part 24 at a plurality of places with equal intervals in a circumferential direction of an axially intermediate portion (a portion except for the other axial end portion). The drive-side concave portion 43 is formed between the drive-side convex portions 25, 25 adjacent to each other in the circumferential direction. The drive-side collar part 39 is provided at the other axial end portion of the outer peripheral surface of the drive-side cylindrical part 24 and has a circular ring shape continuing in the circumferential direction.

The drive-side engaging hole 23 of the drive-side cylindrical part 24 is externally fitted and fixed to an outer peripheral surface of the tip end portion of the output shaft main body 21 by interference fit, spline engagement, key engagement or the like with relative rotation being hindered (so that the torque can be transmitted). Thereby, the drive-side transmission member 22 is supported and fixed to the tip end portion of the output shaft main body 21. Also, in the first example, both circumferential side surfaces of each of the drive-side convex portions 25, 25 configuring the drive-side concave-convex portion 26 are flat surfaces parallel with each other (circumferential width sizes of the respective drive-side convex portions 25, 25 are the same over an axial direction).

The driven-side transmission part 19 has a driven-side transmission member 28 that is provided separately from a worm shaft main body 27 of the worm 8a and is supported and fixed to a base end portion of the worm shaft main body 27. The driven-side transmission member 28 is made of a synthetic resin such as polyamide resin or sintered metal, for example. The driven-side transmission member 28 has a driven-side cylindrical part 30, a driven-side concave-convex portion 32 and a driven-side collar part 40. The driven-side cylindrical part 30 is formed at its central portion with a driven-side engaging hole 29. The driven-side concave-convex portion 32 has driven-side convex portions 31, 31 and a driven-side concave portion 44. The driven-side convex portions 31, 31 protrude radially outwards (radial direction) from the other axial end portion of an outer peripheral surface of the driven-side cylindrical part 30 at a plurality of places with equal intervals in a circumferential direction of an axially intermediate portion (a portion except for one axial end portion). The driven-side concave portion 44 is formed between the driven-side convex portions 31, 31 adjacent to each other in the circumferential direction. The driven-side collar part 40 is provided at one axial end portion of the outer peripheral surface of the driven-side cylindrical part 30 and has a circular ring shape continuing in the circumferential direction.

The driven-side engaging hole 29 of the driven-side cylindrical part 30 is externally fitted and fixed to an outer peripheral surface of the base end portion of the worm shaft main body 27 by interference fit, spline engagement, key engagement or the like with relative rotation being hindered (so that the torque can be transmitted). Thereby, the driven-side transmission member 28 is supported and fixed to the base end portion of the worm shaft main body 27. Also, in the first example, both circumferential side surfaces of each of the driven-side convex portions 31, 31 configuring the driven-side concave-convex portion 32 are flat surfaces parallel with each other (circumferential width sizes of the respective driven-side convex portions 31, 31 are the same over the axial direction).

The coupling 20 is formed to have a substantially cylindrical shape by injection-molding a material softer (rigidity is lower) than a material configuring both the drive-side and driven-side transmission members 22, 28, such as a synthetic resin such as polyamide resin, elastomer such as rubber or a material in which reinforced fibers (for example, glass fibers, carbon fibers) are mixed in the synthetic resin or elastomer. The coupling 20 has a coupling-side cylindrical part 33 and a coupling-side concave-convex portion 35. The coupling-side concave-convex portion 35 has coupling-side convex portions 34, 34 provided over the axial direction at a plurality of places with equal intervals in a circumferential direction of an inner peripheral surface of the coupling-side cylindrical part 33 and protruding radially inwards.

Both axial end portions of each of the coupling-side convex portions 34, 34 are provided with concave portions (thickness-reduced portions) 36, 36 opening into both axial end surfaces of each of the coupling-side convex portions 34, 34 and the outer peripheral surface of the coupling 20 (the coupling-side cylindrical part 33). Thereby, circumferential rigidity of both axial end portions of each of the coupling-side convex portions 34, 34 is made lower than circumferential rigidity of the axially intermediate portion of each of the coupling-side convex portions 34, 34. An axial depth size of each of the concave portions 36, 36 is about one-eighth to a quarter of an axial size of each of the coupling-side convex portions 34, 34. Also, a circumferential width size $W_{41}$ of each of convex portions 41, 41 between the respective concave portions 36, 36 is about 2 to 3 times as large as a circumferential width size $W_{42}$ of each of coupling-side concave portions 42, 42 between the respective coupling-side convex portions 34, 34. In the meantime, each of the concave portions 36, 36 may be formed to have a shape opening into the inner peripheral surface of the coupling 20 or a shape opening (radially penetrating) into the inner and outer circumferential surfaces of the coupling 20. Also, a circumferential width size of each of the coupling-side convex portions 34, 34 decreases (tapers) towards the radially inner side. Also, the circumferential width size of each of the coupling-side convex portions 34, 34 is made to be sufficiently larger (for example, 3 to 7 times) than the circumferential width size of each of the drive-side and driven-side convex portions 25, 31 over the entire axial direction.

The drive-side transmission member 22 is supported and fixed to the tip end portion of the output shaft 12a (output shaft main body 21). The drive-side concave-convex portion 26 of the drive-side transmission member 22 is engaged with a half portion on the other axial side (a right half portion in FIG. 1) of the coupling-side concave-convex portion 35 of the coupling 20 without rattling in the circumferential direction (the drive-side convex portions 25, 25 and the half portions on the other axial sides of the coupling-side convex portions 34, 34 are alternately arranged in the circumferential direction). That is, the circumferential side surface of each of the drive-side convex portions 25, 25 and the circumferential side surface of each of the coupling-side convex portions 34, 34 are contacted or closely face each other over an entire axial length of the drive-side concave-convex portion 26.

Also, the driven-side transmission member 28 is supported and fixed to the base end portion of the worm 8a (worm shaft main body 27). The driven-side concave-convex portion 32 of the driven-side transmission member 28 is engaged with a half portion on one axial side (a left half portion in FIG. 1) of the coupling-side concave-convex portion 35 of the coupling 20 (the driven-side convex portions 31, 31 and the half portions on one axial sides of the coupling-side convex portions 34, 34 are alternately arranged in the circumferential direction). That is, the circumferential side surface of each of the driven-side convex portions 31, 31 and the circumferential side surface of each of the coupling-side convex portions 34, 34 are contacted or closely face each other over an entire axial length of the driven-side concave-convex portion 32.

The drive-side concave-convex portion 26 and the driven-side concave-convex portion 32 engaged with the coupling-side concave-convex portion 35 are arranged in series in the axial direction while axial positions thereof do not overlap with each other. That is, the drive-side transmission part 18 and the driven-side transmission part 19 do not overlap with each other as to the axial positions and are arranged in series in the axial direction.

Thereby, the drive-side transmission part 18 and the driven-side transmission part 19 are coupled via the coupling 20 so that the torque can be transmitted. Meanwhile, in the first example, at the state where both the drive-side and driven-side concave-convex portions 26, 32 are engaged with the coupling-side concave-convex portion 35, the coupling 20 (the coupling-side cylindrical part 33) are sandwiched from both axial sides by both the drive-side and driven-side collar parts 39, 40 (both the drive-side and driven-side collar parts 39, 40 are enabled to contact or to closely face both axial end surfaces of the coupling 20), so that the coupling 20 is prevented from being excessively displaced in the axial direction.

According to the worm reduction gear 15 of the first example, even when central axes of the output shaft 12a and the worm 8a are mismatched, it is possible to smoothly transmit the torque between the output shaft 12a and the worm 8a and to prevent an abnormal noise from being generated between the output shaft 12a and the worm 8a.

That is, according to the first example, both axial end portions of each of the coupling-side convex portions 34, 34 are provided with the concave portions 36, 36, and the circumferential rigidity of both axial end portions of each of the coupling-side convex portions 34, 34 is made lower than the circumferential rigidity of the axially intermediate portion of each of the coupling-side convex portions 34, 34. Therefore, when the worm 8a is caused to oscillate and the central axes of the output shaft 12a and the worm 8a are thus mismatched as the worm teeth 6 is pressed towards the tooth part 5 by the preload applying mechanism 16, both axial end portions of each of the coupling-side convex portions 34, 34 are (circumferentially) elastically deformed. Based on the elastic deformation, the coupling 20 is caused to oscillate. That is, the coupling 20 is inclined relative to at least one of the output shaft 12a and the worm 8a. Thereby, it is possible to smoothly transmit the torque between the output shaft 12a and the worm 8a. Also, since the axially intermediate portion of each of the coupling-side convex portions 34, 34 is not provided with each of the concave portions 36, 36 and the circumferential rigidity is thus sufficiently secured, it is possible to favorably transmit the torque between the output shaft 12a and the worm 8a (it is possible to extremely suppress a delay of the torque transmission).

As described above, in the first example, both axial end portions of each of the coupling-side convex portions 34, 34 is made to have the lower circumferential rigidity and is thus configured to be elastically deformable, so that the coupling 20 can be caused to oscillate. For this reason, both the drive-side and driven-side concave-convex portions 26, 32 are engaged with the coupling-side concave-convex portion 35 without the rattling in the circumferential direction. Therefore, upon start of the torque transmission between the output shaft 12a and the worm 8a, it is possible to prevent the circumferential side surface of each of the drive-side and driven-side convex portions 25, 31 and the circumferential side surface of each of the coupling-side convex portions 34, 34 from strongly colliding (hard colliding) with each other. As a result, it is possible to prevent the abnormal noise such as the gear-tooth striking sound from being generated at the engagement portions between both the drive-side and driven-side concave-convex portions 26, 32 and the coupling-side concave-convex portion 35. Also, it is possible to sufficiently secure a contact area between the circumferential side surface of each of the drive-side and driven-side convex portions 25, 31 and the circumferential side surface of each of the coupling-side convex portions 34, 34, (irrespective of whether the central axes of the output shaft 12a and the worm 8a are matched or not). For this reason, it is possible to prevent a contact surface pressure between the circumferential side surface of each of the drive-side and driven-side convex portions 25, 31 and the circumferential side surface of each of the coupling-side convex portions 34, 34 from unnecessarily increasing, so that it is possible to suppress the stress from being concentrated on the engagement portions between both the drive-side and driven-side concave-convex portions 26, 32 and the coupling-side concave-convex portion 35. Therefore, it is possible to secure the durability of the torque-transmission joint 17 and the entire worm reduction gear 15.

Also, in the first example, the concave portions 36, 36 are formed to open into both axial end surfaces of the coupling 20, respectively. For this reason, when making the coupling 20 by the injection molding, it is possible to easily form the respective concave portions 36, 36. Also, since the concave portions 36, 36 are formed, it is possible to save the material of the coupling 20 as much as that, so that it is possible to reduce the manufacturing cost of the torque-transmission joint 17 and the worm reduction gear 15.

Also, in the first example, the radial gaps are respectively formed between the coupling-side convex portion 34 and the drive-side concave portion 43 and driven-side concave portion 44 and between the coupling-side concave portion 42 and the drive-side convex portion 25 and driven-side convex portion 31. Therefore, when the central axes of the output shaft 12a and the worm 8a are mismatched, the coupling 20a is caused to oscillate on the basis of the radial gaps. That is, the coupling 20a is inclined relative to at least one of the output shaft 12a and the worm 8a. Thereby, it is possible to smoothly transmit the torque between the output shaft 12a and the worm 8a.

In the meantime, when implementing the present invention, the drive-side transmission part 18 (the driven-side transmission part 19) may be directly formed at the tip end portion of the output shaft of the electric motor (the base end portion of the worm shaft) without interposing the drive-side transmission member 22 (the driven-side transmission member 28).

Second Example of Embodiment

Figure 1:
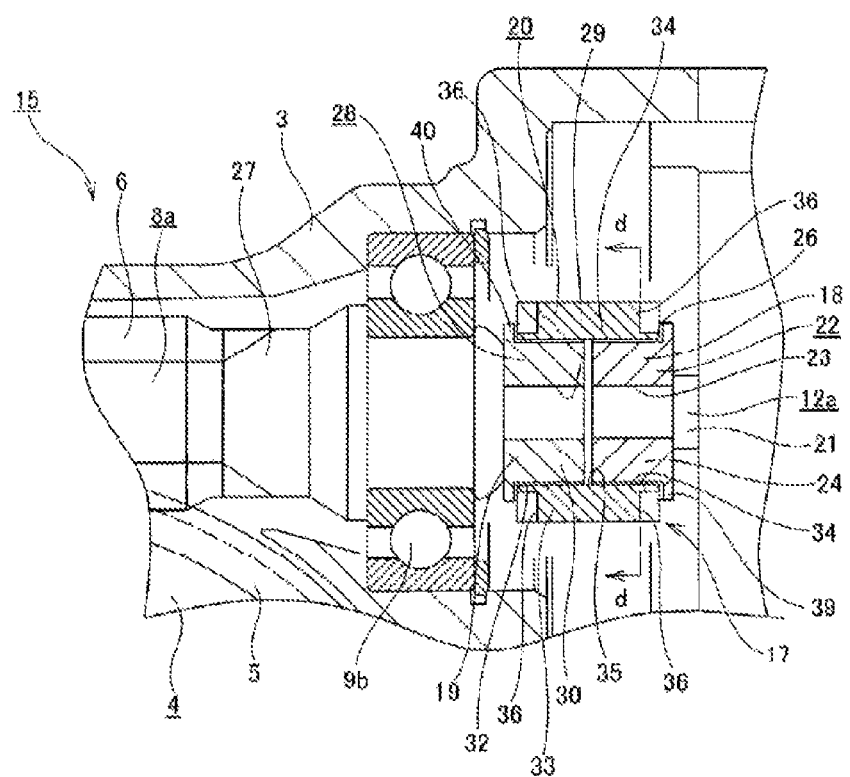
FIG. 1 is an enlarged sectional view of main parts, depicting a first example of an embodiment.
Figure 2A:
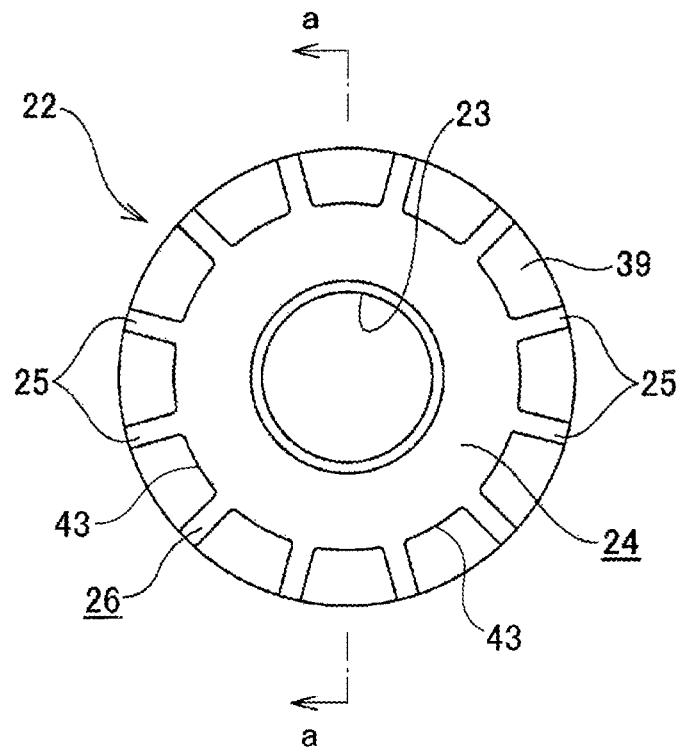
FIG. 2A is an end view of a drive-side transmission member.
Figure 2B:
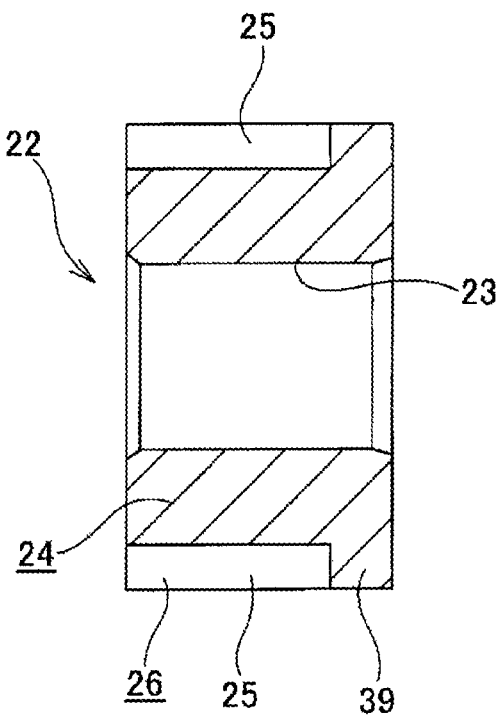
FIG. 2B is a sectional view taken along a line a-a of FIG. 2A.
Figure 3A:
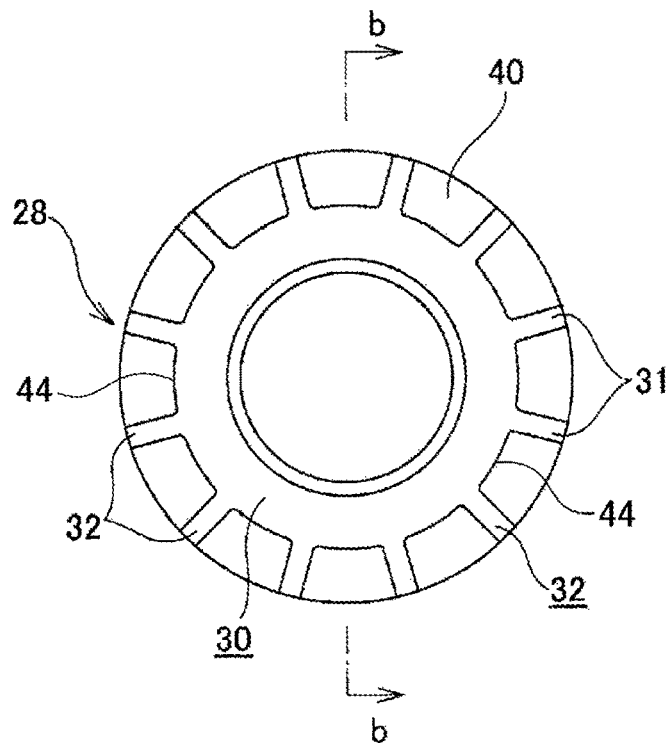
FIG. 3A is an end view of a driven-side transmission member.
Figure 3B:
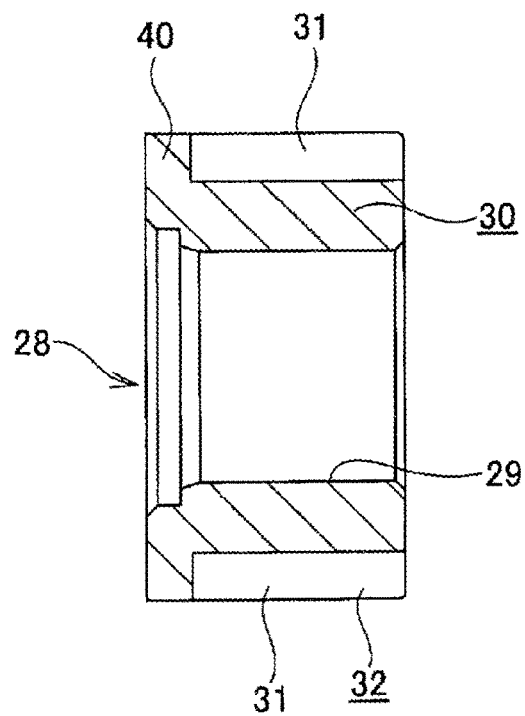
FIG. 3B is a sectional view taken along a line b-b of FIG. 3A.
Figure 4A:
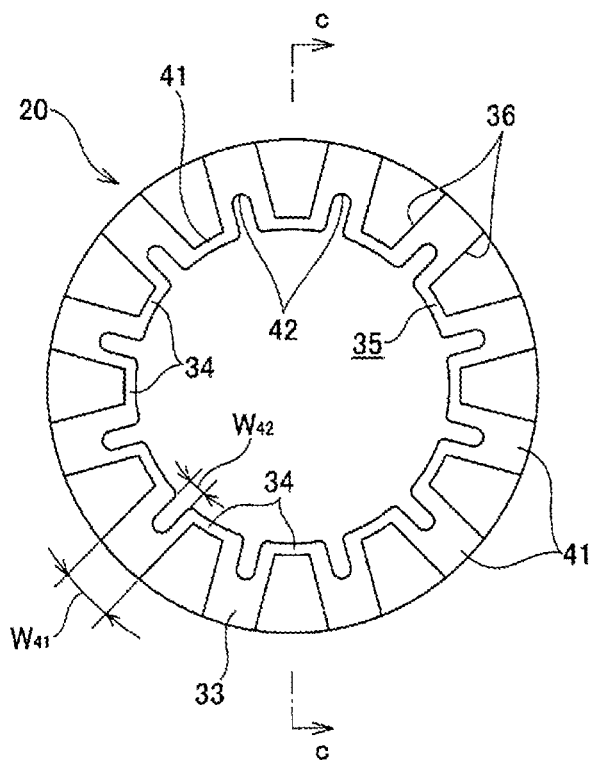
FIG. 4A is an end view of a coupling.
Figure 4B:
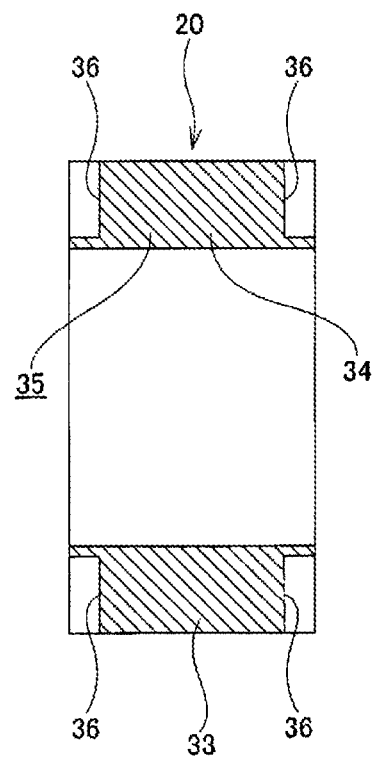
FIG. 4B is a sectional view taken along a line c-c of FIG. 4A.
Figure 5A:
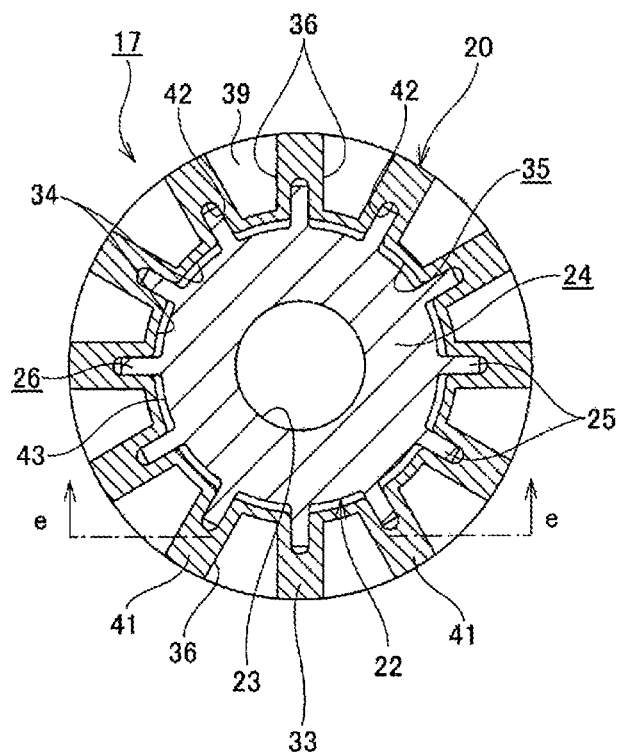
FIG. 5A is a sectional view taken along a line d-d of FIG. 1.
Figure 5B:
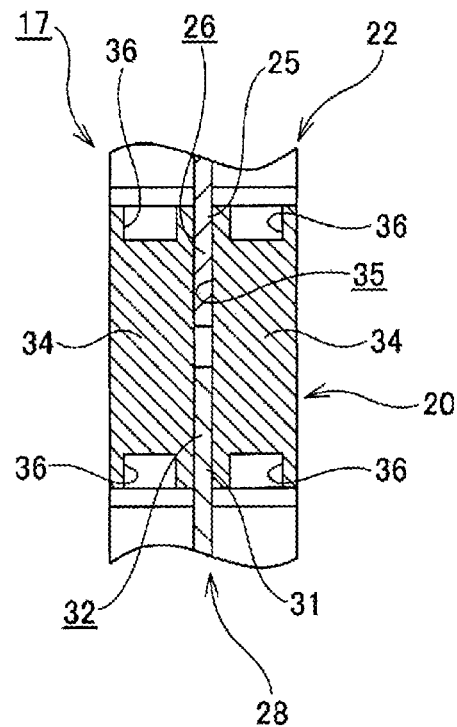
FIG. 5B is a sectional view taken along a line e-e of FIG. 5A.
Figure 6:
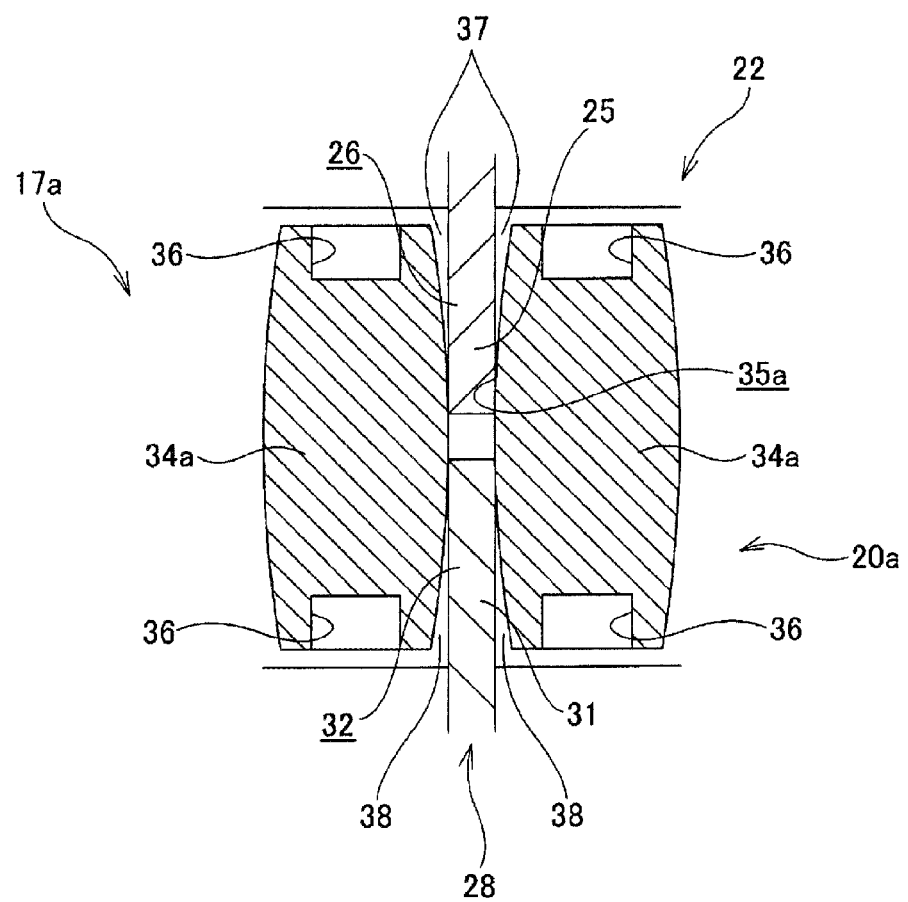
FIG. 6 is a view equivalent to FIG. 5B, depicting a second example of the embodiment.

FIG. 6 depicts a second example of the embodiment. In a torque-transmission joint 17a of the second example, when seen from a radial direction, both circumferential side surfaces of each of coupling-side convex portions 34a, 34a have a crowning shape having a partial arc shape inclined in a direction in which a circumferential width size of each of the coupling-side convex portions 34a, 34a is greatest (thickest) at an axially intermediate portion and decreases (thins) towards both axial end portions.

Meanwhile, also in the second example, like the first example of the embodiment, both axial end portions of each of the coupling-side convex portions 34a, 34a are provided with concave portions 36, 36 opening into both axial end surfaces of each of the coupling-side convex portions 34a, 34a and an outer peripheral surface of a coupling 20a. Thereby, the circumferential rigidity of both axial end portions of each of the coupling-side convex portions 34a, 34a is made lower than the circumferential rigidity of the axially intermediate portion.

In the meantime, both circumferential side surfaces of each of the drive-side convex portions 25, 25 are flat surfaces parallel with each other, like the first example of the embodiment. That is, the circumferential width size of each of the drive-side convex portions 25, 25 is the same over the axial direction. Also, both circumferential side surfaces of each of the driven-side convex portions 31, 31 are flat surfaces parallel with each other. That is, the circumferential width size of each of the driven-side convex portions 31, 31 is the same over the axial direction.

At a state where the drive-side concave-convex portion 26 is engaged with a half portion on the other axial side of a coupling-side concave-convex portion 35a and the central axes of the output shaft 12a and the worm 8a (refer to FIG. 1) are matched, one axial end portion of the circumferential side surface of each of the drive-side convex portions 25, 25 and the circumferential side surface of each of the coupling-side convex portions 34a, 34a are contacted or closely face each other without the rattling in the circumferential direction. Also, drive-side gaps 37, 37 of which a circumferential width size increases towards the other axial side are interposed between the other end portions from the axially intermediate portions of the circumferential side surfaces of the respective drive-side convex portions 25, 25 and the circumferential side surfaces of the respective coupling-side convex portions 34a, 34a.

Also, at a state where the driven-side concave-convex portion 32 is engaged with a half portion on one axial side of the coupling-side concave-convex portion 35a and the central axes of the output shaft 12a and the worm 8a are matched, the other axial end portion of the circumferential side surface of each of the driven-side convex portion 31, 31 and the circumferential side surface of each of the coupling-side convex portions 34a, 34a are contacted or closely face each other without the rattling in the circumferential direction. Also, driven-side gaps 38, 38 of which a circumferential width size increases towards one axial side are interposed between one end portions from the axially intermediate portions of the circumferential side surfaces of the respective driven-side convex portion 31, 31 and the circumferential side surfaces of the respective coupling-side convex portions 34a, 34a.

When the central axes of the output shaft 12a and the worm 8a are mismatched, the coupling 20a is caused to oscillate on the basis of both the drive-side and driven-side gaps 37, 38, the radial gaps between the coupling-side convex portion 34 and the drive-side concave portion 43 and driven-side concave portion 44 and the radial gaps between the coupling-side concave portion 42 and the drive-side convex portion 25 and driven-side convex portion 31. That is, the coupling 20a is inclined relative to at least one of the output shaft 12a and the worm 8a. From this state, when the mismatch of the central axes of the output shaft 12a and the worm 8a further increases, both axial end portions of each of the coupling-side convex portions 34a, 34a are elastically deformed and the coupling 20a is further inclined relative to at least one shaft. Thereby, it is possible to smoothly transmit the torque between the output shaft 12a and the worm 8a. According to the structure of the second example, since the drive-side and driven-side gaps 37, 38 are provided, it is possible to increase a permissible amount of the mismatch of the central axes of the output shaft 12a and the worm 8a as much as that, as compared to the first example of the embodiment.

In the meantime, when implementing the structure of the second example, the circumferential side surface of each of the drive-side and driven-side convex portions 25, 31 may be formed to have a crowning shape having a partial arc shape as seen from the radial direction or may be inclined in a direction in which the circumferential width size of each of the drive-side and driven-side convex portions 25, 31 decreases towards both sides of the coupling in the width direction (axis direction).

Also, when grease (lubricant) is interposed at the engagement portions between both the drive-side and driven-side concave-convex portions 26, 32 and the coupling-side concave-convex portion 35a, it is possible to cause the coupling 20a to smoothly oscillate. In this case, shot blast may be performed for at least one of the circumferential side surfaces of the drive-side and driven-side convex portions 25, 31 facing each other and the circumferential side surfaces of the respective coupling-side convex portions 34a, 34a, so that a plurality of minute concave portions may be formed in the at least one surface. When the minute concave portions are provided, the minute concave portions function as oil-keeping concave portions for keeping therein the grease, so that it is possible to easily keep the grease at the engagement portions between both the drive-side and driven-side concave-convex portions 26, 32 and the coupling-side concave-convex portion 35a.

The other configurations and operations are the same as the first example of the embodiment.

Third Example of Embodiment

FIGS. 7A to 13 depict a third example of the embodiment. In a coupling 20b of the third example, at least one coupling-side protrusion 50 is formed at the axially intermediate portion of the inner peripheral surface of the coupling-side cylindrical part 33. The coupling-side protrusion 50 is formed between the drive-side transmission part 18 and the driven-side transmission part 19 in the axial direction.

Figure 7A:
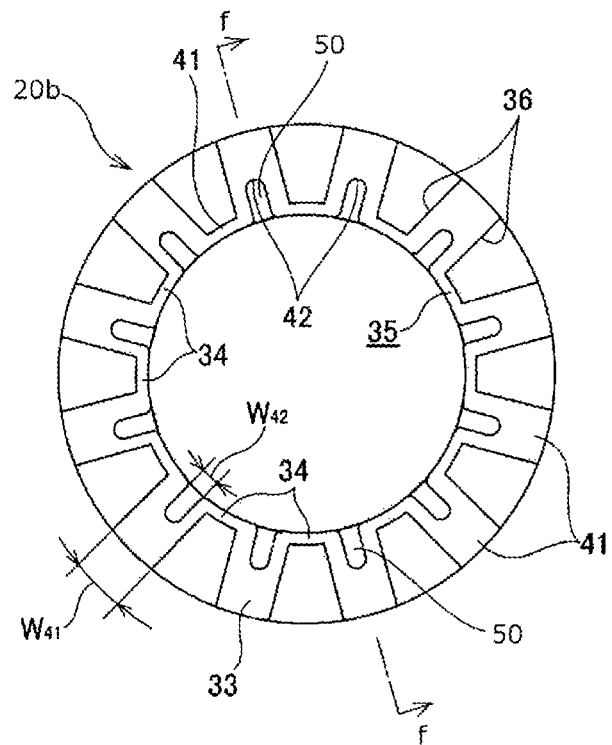
FIG. 7A is an end view of a coupling of a third example of the embodiment.
Figure 8:
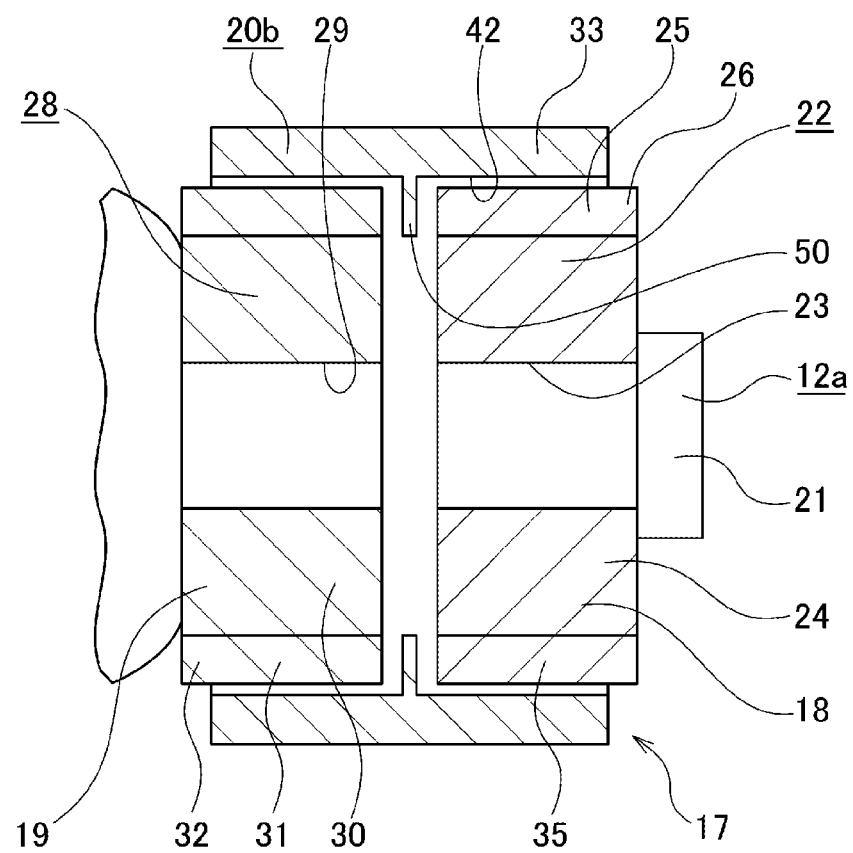
FIG. 8 is an enlarged sectional view of main parts, depicting the third example of the embodiment.
Figure 9:
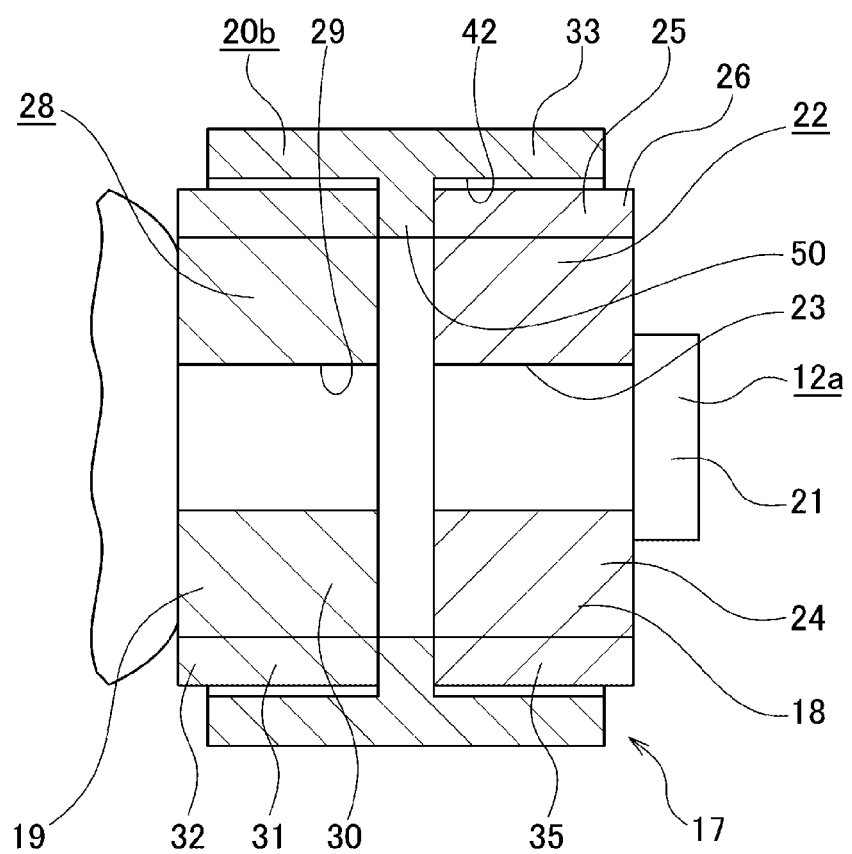
FIG. 9 is an enlarged sectional view of main parts, depicting the third example of the embodiment.

In an example of FIGS. 7A and 8, the coupling-side protrusion 50 protrudes radially inwards from the coupling-side concave portion 42. A tip end portion (a radially inner end portion) of the coupling-side protrusion 50 overlaps with the drive-side concave-convex portion 26 and the driven-side concave-convex portion 32 in the radial direction. The coupling-side protrusion 50 axially faces the drive-side convex portion 25 and driven-side convex portion 31 with gaps interposed therebetween. However, like an example of FIG. 9, the coupling-side protrusion 50 may be in contact with the drive-side convex portion 25 and driven-side convex portion 31 without the axial gaps.

Meanwhile, in the examples of FIGS. 7A to 9, the coupling-side protrusion 50 is formed for each of the coupling-side concave portions 42. However, at least one coupling-side protrusion 50 may be formed. For example, some of the coupling-side concave portions 42 may be selected and the coupling-side protrusion 50 may be formed for each of the selected coupling-side concave portions 42.

According to this example, since the at least one coupling-side protrusion 50 faces the drive-side convex portion 25 and the driven-side convex portion 31 in the axial direction, axial displacement of the coupling 20b is restrained by the drive-side convex portion 25 and the driven-side convex portion 31.

Figure 7B:
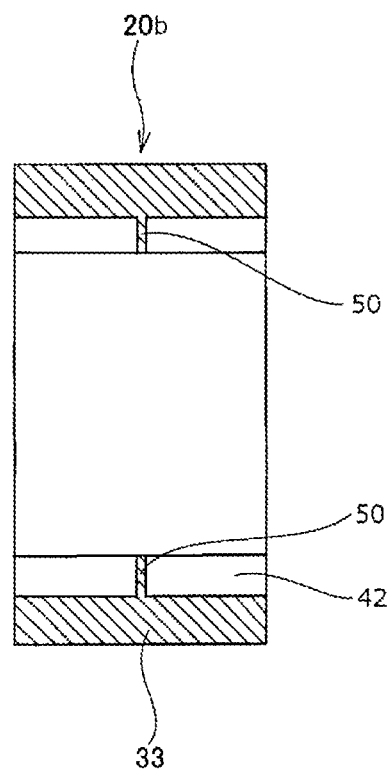
FIG. 7B is a sectional view taken along a line f-f of FIG. 7A.
Figure 10:
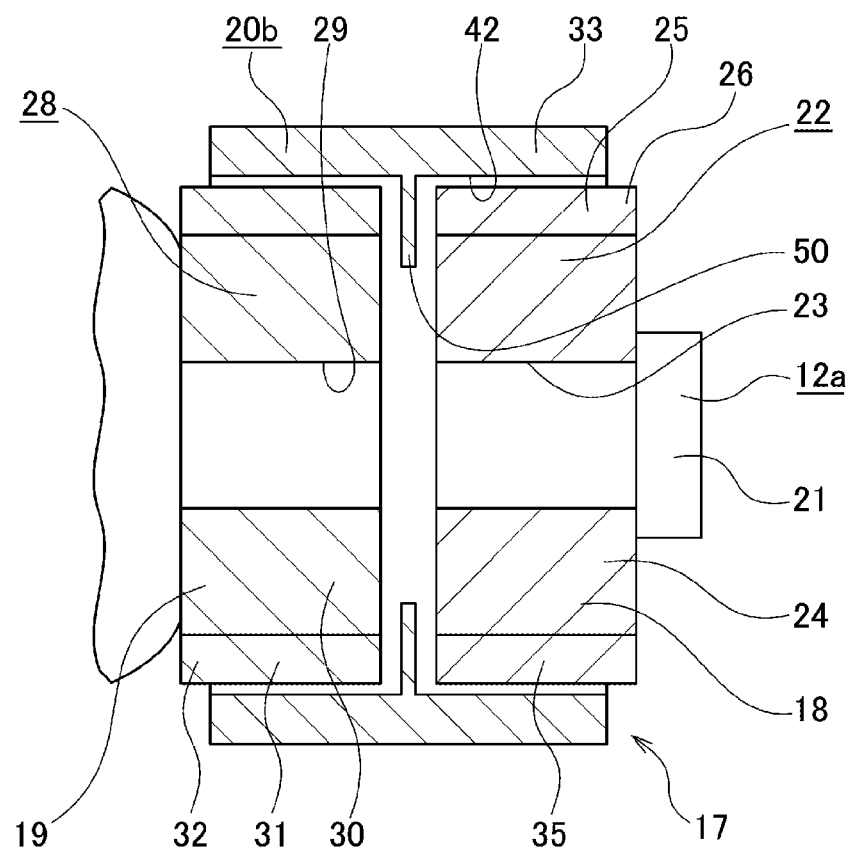
FIG. 10 is an enlarged sectional view of main parts, depicting the third example of the embodiment.

In an example of FIG. 10, the coupling-side protrusion 50 is the same as the example of FIGS. 7A to 8, in that it protrudes radially inwards from the coupling-side concave portion 42. However, the example of FIG. 10 is different from the example of FIGS. 7A to 8, in that the tip end portion (radially inner end portion) of the coupling-side protrusion 50 is positioned at the radially inner side relative to the drive-side concave-convex portion 26 and the driven-side concave-convex portion 32. Also, the coupling-side protrusion 50 axially faces the drive-side convex portion 25 and driven-side convex portion 31 and the drive-side cylindrical part 24 and driven-side cylindrical part 30 with gaps being interposed therebetween. However, like an example of FIG. 11, the coupling-side protrusion 50 may be in contact with the drive-side convex portion 25 and driven-side convex portion 31 and the drive-side cylindrical part 24 and driven-side cylindrical part 30 without the axial gaps.

Figure 11:
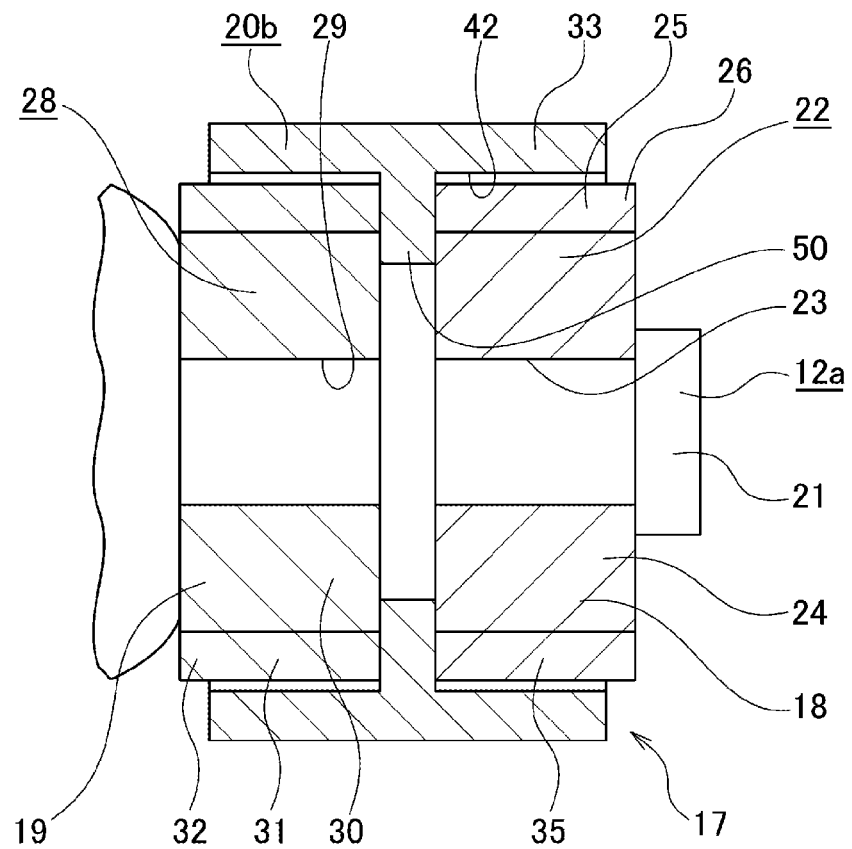
FIG. 11 is an enlarged sectional view of main parts, depicting the third example of the embodiment.

Meanwhile, in the examples of FIGS. 10 and 11, the coupling-side protrusion 50 is formed for each of the coupling-side concave portions 42. However, at least one coupling-side protrusion 50 may be formed. For example, some of the coupling-side concave portions 42 may be selected and the coupling-side protrusion 50 may be formed for each of the selected coupling-side concave portions 42.

According to this example, since the at least one coupling-side protrusion 50 faces the drive-side convex portion 25 and driven-side convex portion 31 and the drive-side cylindrical part 24 and driven-side cylindrical part 30 in the axial direction, the axial displacement of the coupling 20b is restrained by the drive-side convex portion 25 and driven-side convex portion 31 and the drive-side cylindrical part 24 or the driven-side cylindrical part 30.

Figure 12:
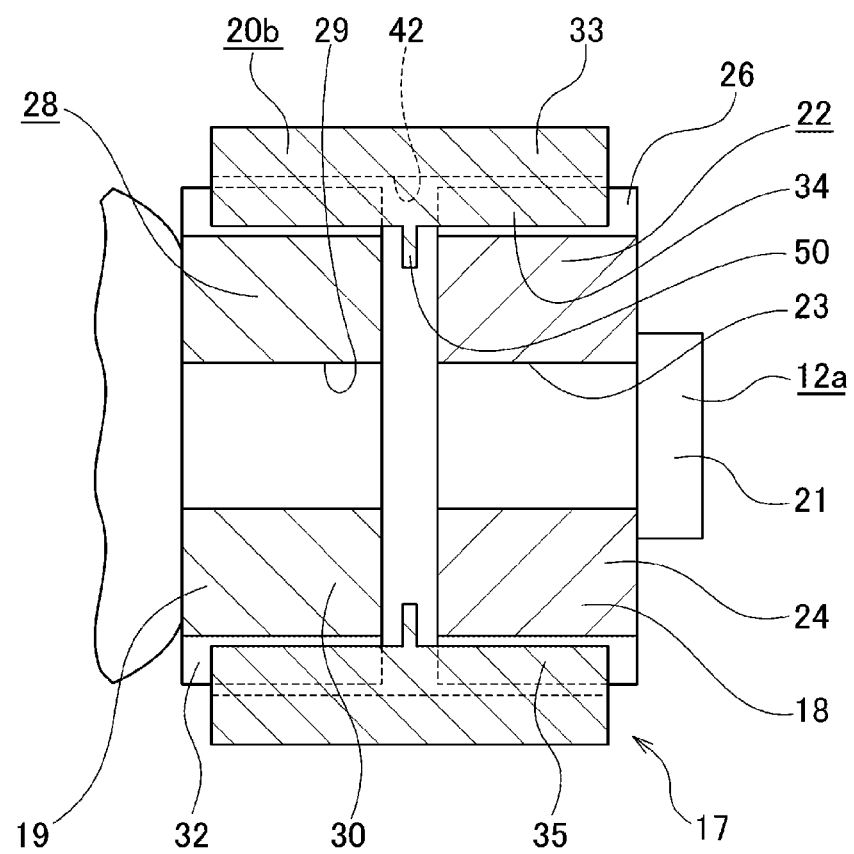
FIG. 12 is an enlarged sectional view of main parts, depicting the third example of the embodiment.

In an example of FIG. 12, the coupling-side protrusion 50 protrudes radially inwards from the coupling-side convex portion 34. The coupling-side protrusion 50 axially faces the drive-side cylindrical part 24 and driven-side cylindrical part 30 with the gaps being interposed therebetween. However, like an example of FIG. 13, the coupling-side protrusion 50 may be in contact with the drive-side cylindrical part 24 and driven-side cylindrical part 30 without the axial gaps.

Figure 13:
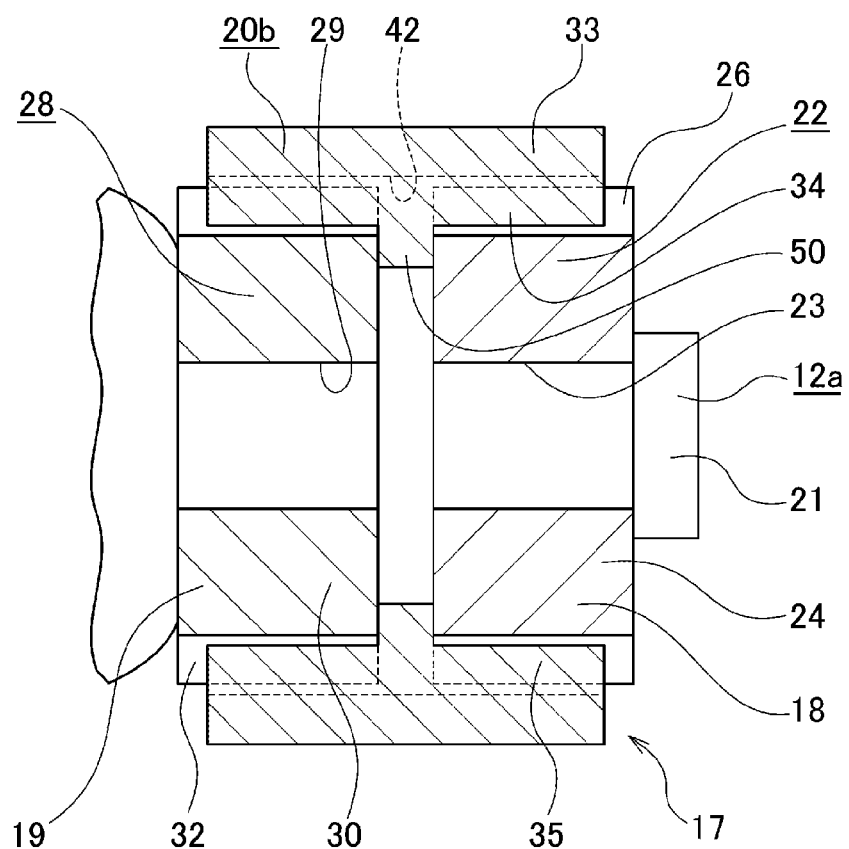
FIG. 13 is an enlarged sectional view of main parts, depicting the third example of the embodiment.

Meanwhile, in the examples of FIGS. 12 and 13, the coupling-side protrusion 50 is formed for each of the coupling-side convex portions 34. However, at least one coupling-side protrusion 50 may be formed. For example, some of the coupling-side convex portion 34 may be selected and the coupling-side protrusion 50 may be formed for each of the selected coupling-side convex portion 34.

According to this example, since the at least one coupling-side protrusion 50 faces the drive-side cylindrical part 24 and driven-side cylindrical part 30 in the axial direction, the axial displacement of the coupling 20b is restrained by the drive-side cylindrical part 24 or the driven-side cylindrical part 30.

In the meantime, the coupling 20b may be configured by combining the plurality of types of coupling-side protrusions 50 shown in FIGS. 7A to 13. For example, in one coupling 20b, the coupling-side protrusion 50 of FIG. 12 may be formed for the coupling-side convex portion 34 and the coupling-side protrusion 50 of FIGS. 7A to 8 may be formed for the coupling-side concave portion 42.

According to this example, since the inner peripheral surface of the coupling-side cylindrical part 33 is formed with the annular coupling-side protrusion 50 between the drive-side transmission part 18 and the driven-side transmission part 19 in the axial direction, the axial displacement of the coupling 20b is restrained by the drive-side transmission part 18 or the driven-side transmission part 19, so that the axial position of the coupling 20b becomes stable. Therefore, even though both the drive-side and driven-side collar parts 39, 40 (refer to FIG. 1) are not provided, it is possible to restrain the axial displacement of the coupling 20b. When both the drive-side and driven-side collar parts 39, 40 are not provided, it is possible to reduce a weight of a component and to save the cost. Meanwhile, in the examples of FIGS. 7A to 13, both the drive-side and driven-side collar parts 39, 40 are not provided. However, in order to further stabilize the axial position of the coupling 20b, both the drive-side and driven-side collar parts 39, 40 may be provided in addition to the coupling-side protrusion 50.

In the meantime, when the outer peripheral surface of the coupling is provided with the coupling-side concave-convex portion, the coupling-side protrusion is preferably provided on the outer peripheral surface of the coupling.

Fourth Example of Embodiment

Figure 14A:
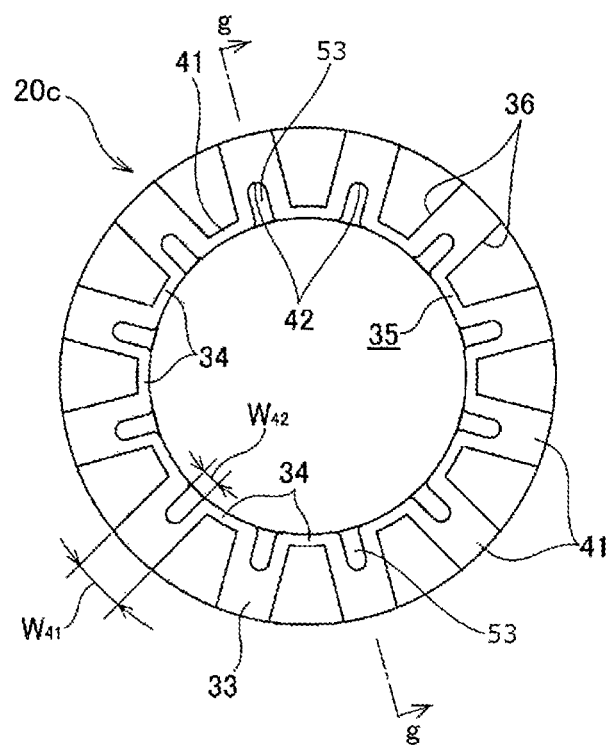
FIG. 14A is an end view of a coupling of a fourth example of the embodiment.
Figure 14B:
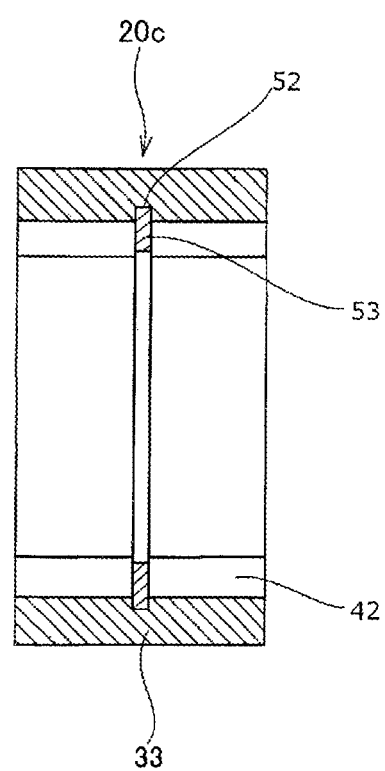
FIG. 14B is a sectional view taken along a line g-g of FIG. 14A.

FIGS. 14A and 14B depict a coupling 20c of a fourth example of the embodiment. A circumferential groove 52 is provided at the axially central portion of the inner peripheral surface of the coupling-side cylindrical part 33. A hollow disc-shaped damper 53 is fitted in the circumferential groove 52. The damper 53 is made of an easily elastically deformable material such as rubber and elastomer. The damper 53 is provided between the drive-side transmission part 18 and the driven-side transmission part 19 in the axial direction. More specifically, the damper 53 faces the drive-side convex portion 25 and driven-side convex portion 31 and the drive-side cylindrical part 24 and driven-side cylindrical part 30 with the axial gaps being interposed therebetween or contacts the same without the axial gaps.

Like this, in this example, it is possible to position the coupling 20b relative to the driven-side cylindrical part 30 and the drive-side transmission member 22 by the damper 53. Therefore, when the damper 53 is provided, the driven-side collar part 40 and the drive-side collar part 39 are not necessarily provided. When the driven-side collar part 40 and the drive-side collar part 39 are not provided, it is possible to reduce the weight of the component and to save the cost. Also, since a thrust force, which is to be transmitted between the worm 8a and the output shaft 12a, is partially absorbed by the damper 53, the thrust force is prevented from excessively increasing.

Fifth Example of Embodiment

Figure 15:
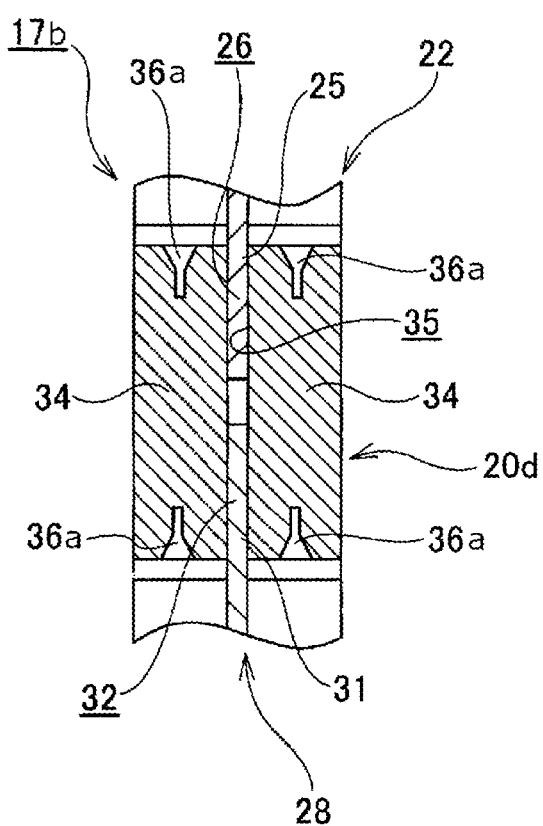
FIG. 15 is the same view as FIG. 5B, depicting a fifth example of the embodiment.

FIG. 15 depicts a coupling 20d of a fifth example of the embodiment. A shape of concave portions (thickness-reduced portions) 36a, 36a opening into both axial end surfaces of each of the coupling-side convex portions 34, 34 and the outer peripheral surface of the coupling 20d (the coupling-side cylindrical part 33) is a Y-shaped section. That is, each of the concave portions 36a, 36a has a triangular portion of which a width size decreases axially inwards from both axial end surfaces of each of the coupling-side convex portions 34, 34 and a rectangular portion connected to a tip end portion of the triangular portion and further extending axially inwards. The concave portions 36a, 36a are configured to have the Y-shaped section, so that it is possible to make the circumferential rigidity of both axial end portions of each of the coupling-side convex portions 34, 34 further lower than the circumferential rigidity of the axially intermediate portion of each of the coupling-side convex portions 34, 34. Thereby, it is possible to further absorb the center deviation of the axes between the output shaft 12a and the worm 8a or the inclination.

Sixth Example of Embodiment

Figure 16:
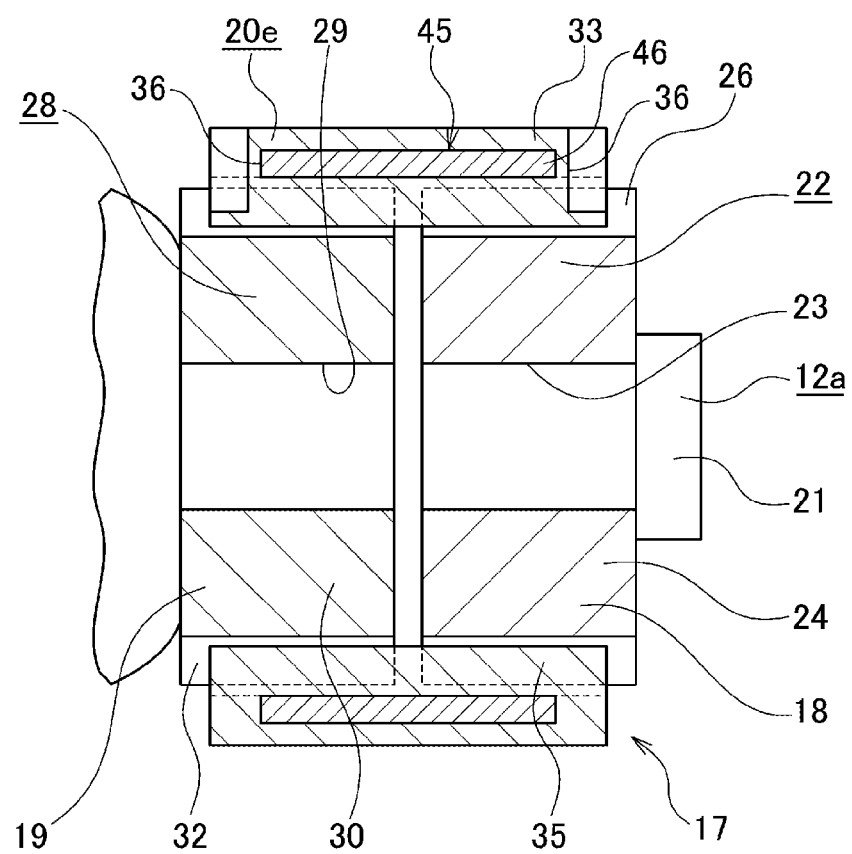
FIG. 16 is an enlarged sectional view of main parts, depicting a sixth example of the embodiment.
Figure 17:
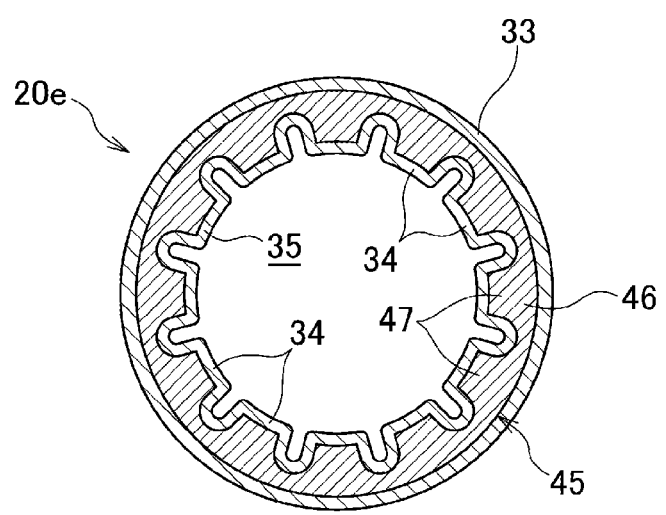
FIG. 17 is a sectional view of a coupling.

FIGS. 16 and 17 depict a sixth example of the embodiment of the present invention. In a coupling 20e of the sixth example, a core bar 45 having a circle ring shape as a whole is arranged in the coupling-side cylindrical part 33. The core bar 45 has a cylindrical part 46 concentric with the coupling 20e. The cylindrical part 46 at least axially overlaps with the engagement portions between the drive-side concave-convex portion 26 and driven-side concave-convex portion 32 and the coupling-side concave-convex portion 35.

As shown in FIG. 17, the core bar 45 may have a plurality of convex portions 47 protruding radially inwards from an inner peripheral surface of the cylindrical part 46 with equal intervals in the circumferential direction. The plurality of convex portions 47 is provided at positions at which they overlap with the plurality of coupling-side convex portions 34 of the coupling 20 in the circumferential direction as many as the coupling-side convex portions. On the other hand, the number of the convex portions 47 may not be the same as the plurality of coupling-side convex portions 34. A circumferential length of the convex portion 47 is equal to or smaller than a circumferential length of the coupling-side convex portion 34.

According to the sixth example, since the core bar 45 is arranged in the coupling 20e, it is possible to improve the rigidity of the coupling 20e. In particular, since the core bar 45 at least axially overlaps with the engagement portions between the drive-side concave-convex portion 26 and driven-side concave-convex portion 32 and the coupling-side concave-convex portion 35, it is possible to improve the effect of the rigidity improvement of the coupling 20e on the rotation torque. Also, when the core bar 45 is provided with the plurality of convex portions 47, the rigidity of the coupling 20e is further improved.

Seventh Example of Embodiment

Figure 18:
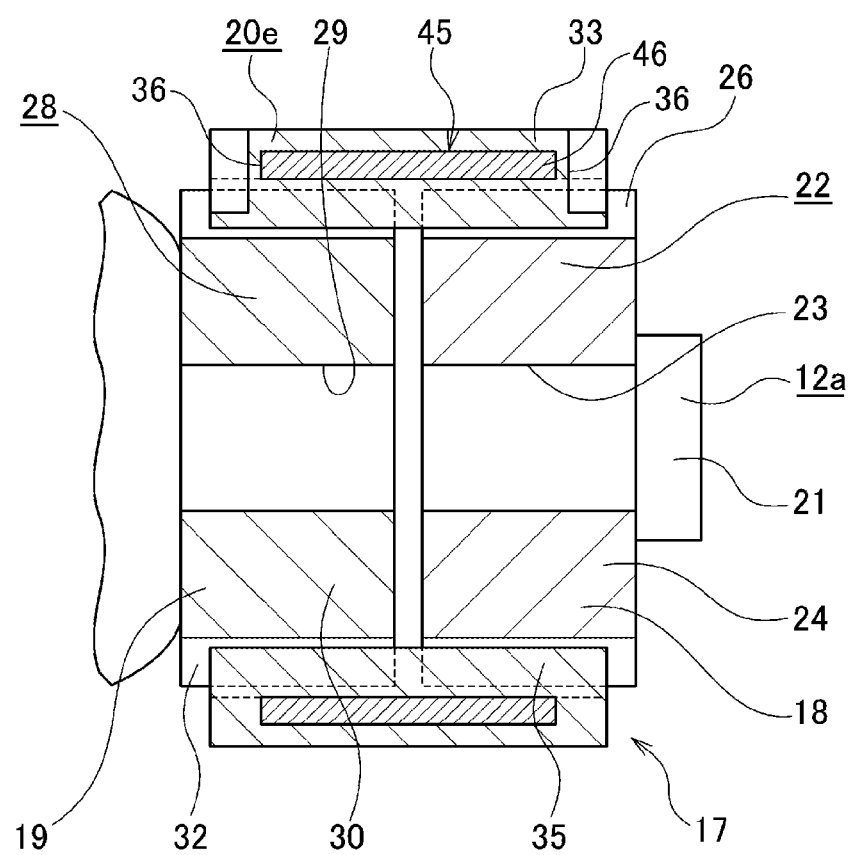
FIG. 18 is an enlarged sectional view of main parts, depicting the seventh example of the embodiment.
Figure 19:
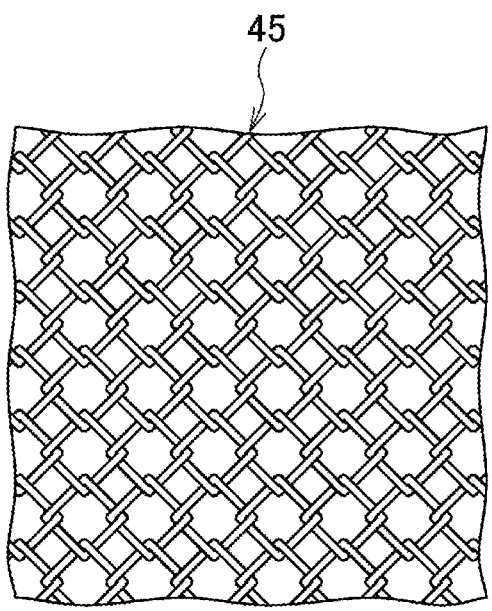
FIG. 19 is a partially developed view of a core bar configuring the coupling.

FIGS. 18 and 19 depict a seventh example of the embodiment of the present invention. Also in a coupling 20f of the seventh example, the core bar 45 is arranged in the coupling-side cylindrical part 33, like the sixth example. However, the core bar 45 of the seventh example is configured by rolling a metal mesh-shaped sheet or a chain-shaped metal member as shown in FIG. 19 into a cylinder shape.

According to the seventh example, it is possible to improve the rigidity of the coupling 20f, like the sixth example. In addition, since the coupling 20f can be easily bent, the coupling 20f is caused to oscillate more flexibly when the worm 8a is caused to oscillate. Therefore, it is possible to further smoothly transmit the torque between the output shaft 12a and the worm 8a.

The subject application is based on a Japanese Patent Application No. 2015-092090 filed on Apr. 28, 2015, a Japanese Patent Application No. 2016-036509 filed on Feb. 29, 2016, a Japanese Patent Application No. 2016-036511 filed on Feb. 29, 2016, and a Japanese Patent Application No. 2016-051748 filed on Mar. 16, 2016, which are herein incorporated by reference.

INDUSTRIAL APPLICABILITY

When implementing the present invention, the inner peripheral surface of the concave portion provided at the tip end portion of the output shaft of the electric motor may be formed with the drive-side concave-convex portion, the inner peripheral surface of the concave portion provided at the base end portion of the worm shaft may be formed with the driven-side concave-convex portion, and the coupling-side concave-convex portion provided on the outer peripheral surface of the coupling may be engaged with the drive-side concave-convex portion and the driven-side concave-convex portion. Also, in this way, when the coupling-side concave-convex portion is provided on the outer peripheral surface of the coupling, the concave portion opening into both axial end surfaces and the inner peripheral surface of the coupling may be provided, for example. However, when implementing the present invention, the position of the opening of the concave portion is not particularly limited, and the concave portion may be formed to open into only the axial end surface or only the circumferential surface.

DESCRIPTION OF REFERENCE NUMERALS

1: steering wheel, 2: steering shaft, 3: housing, 4: worm wheel, 5: tooth part, 6: worm teeth, 7: electric motor, 8, 8a:

worm, 9*a*, 9*b*: rolling bearing, 10: pressing piece, 11: coil spring, 12, 12*a*: output shaft, 13: spline hole, 14: spline shaft part, 15: worm reduction gear, 16: preload applying mechanism, 17, 17*a*, 17*b*: torque-transmission joint, 18: drive-side transmission part, 19: driven-side transmission part, 20, 20*a*, 20*b*, 20*c*, 20*d*, 20*e*: coupling, 21: output shaft main body, 22: drive-side transmission member, 23: drive-side engaging hole, 24: drive-side cylindrical part, 25: drive-side convex portion, 26: drive-side concave-convex portion, 27: worm shaft main body, 28: driven-side transmission member, 29: driven-side engaging hole, 30: driven-side cylindrical part, 31: driven-side convex portion, 32: driven-side concave-convex portion, 33: coupling-side cylindrical part, 34, 34*a*: coupling-side convex portion, 35, 35*a*: coupling-side concave-convex portion, 36, 36*a*: concave portion, 37: drive-side gap, 38: driven-side gap, 39: drive-side collar part, 40: driven-side collar part, 41: convex portion, 42: coupling-side concave portion, 43: drive-side concave portion, 44: driven-side concave portion, 45: core bar, 46: cylindrical part. 47: convex portion, 50: coupling-side protrusion, 52: circumferential groove, 53: damper

The invention claimed is:

1. A torque-transmission joint is configured to transmit torque between one axial end portion of a drive shaft and the other axial end portion of a driven shaft arranged in series with each other in an axial direction, the torque-transmission joint comprising:
 a coupling provided on one circumferential surface of inner and outer circumferential surfaces with a coupling-side concave-convex portion having coupling-side convex portions arranged at a plurality of circumferential places and protruding in a radial direction;
 a drive-side transmission part provided at the one axial end portion of the drive shaft and is provided on one circumferential surface, which faces the coupling-side concave-convex portion, of inner and outer circumferential surfaces with a drive-side concave-convex portion having drive-side convex portions arranged at a plurality of circumferential places and protruding in a radial direction; and
 a driven-side transmission part provided at the other axial end portion of the driven shaft and is provided on one circumferential surface, which faces the coupling-side concave-convex portion, of inner and outer circumferential surfaces with a driven-side concave-convex portion having driven-side convex portions arranged at a plurality of circumferential places and protruding in a radial direction;
 wherein circumferential rigidity of both axial end portions of each coupling-side convex portion is lower than circumferential rigidity of an axially intermediate portion of each coupling-side convex portion,
 wherein the drive-side concave-convex portion is engaged with a half portion on the other axial side of the coupling-side concave-convex portion, and the driven-side concave-convex portion is engaged with a half portion on one axial side of the coupling-side concave-convex portion, and
 wherein both axial end portions of each coupling-side convex portion is provided with a thickness-reduced portion opening into both axial end surfaces of each coupling-side convex portion and an outer peripheral surface of the coupling.

2. The torque-transmission joint according to claim 1, wherein both axial end surfaces of each coupling-side convex portion are formed with concave portions axially recessed.

3. The torque-transmission joint according to claim 1, wherein at the state where the central axes of the drive shaft and the driven shaft are matched, the drive-side concave-convex portion is engaged with the half portion on the other axial side of the coupling-side concave-convex portion with a drive-side gap of which a circumferential width size increases towards the other axial side being interposed between the circumferential side surface of each drive-side convex portion and the circumferential side surface of each coupling-side convex portion, and
 wherein at the state where the central axes of the drive shaft and the driven shaft are matched, the driven-side concave-convex portion is engaged with the half portion on one axial side of the coupling-side concave-convex portion with a driven-side gap of which a circumferential width size increases towards one axial side being interposed between the circumferential side surface of each driven-side convex portion and the circumferential side surface of each coupling-side convex portion.

4. The torque-transmission joint according to claim 3, wherein the circumferential side surface of each coupling-side convex portion has a crowning shape inclined in a direction in which a circumferential width size of each coupling-side convex portion is greatest at an axially intermediate portion and decreases toward both axial end portions.

5. The torque-transmission joint according to claim 1, wherein one circumferential surface of both the inner and outer circumferential surfaces of the coupling is formed with a coupling-side protrusion protruding in the radial direction, and
 wherein the coupling-side protrusion is positioned between the drive-side transmission part and the driven-side transmission part in the axial direction.

6. The torque-transmission joint according to claim 1, wherein the thickness-reduced portion comprises:
 a triangular portion of which a width size decreases axially inwards from both axial end surfaces of each coupling-side convex portion; and
 a rectangular portion connected to a tip end portion of the triangular portion and further extending axially inwards.

7. A worm reduction gear comprising:
 a housing;
 a worm wheel rotatably supported to the housing;
 a worm rotatably supported to the housing at a state where worm teeth provided on an axially intermediate portion thereof are meshed with the worm wheel; and
 an electric motor provided to rotatively drive the worm;
 wherein the worm and an output shaft of the electric motor are connected by a torque-transmission joint so that torque can be transmitted therebetween, and
 wherein the torque-transmission joint is the torque-transmission joint according to claim 1.

* * * * *